(12) United States Patent
Pederson et al.

(10) Patent No.: US 7,261,196 B2
(45) Date of Patent: Aug. 28, 2007

(54) DRIVE ASSEMBLY WITH LIGHTWEIGHT BACKSTOPPING CLUTCH

(75) Inventors: Jack Eric Pederson, Saline, MI (US); John Thomas Haddon, Brighton, MI (US); Amy Lynn Chan, Sterling Heights, MI (US); Michael Paul Travis, Royal Oak, MI (US)

(73) Assignee: Warner Electric Technology LLC, Quincy, MA (US)

( * ) Notice: Subject to any disclaimer, the term of this patent is extended or adjusted under 35 U.S.C. 154(b) by 64 days.

(21) Appl. No.: 11/064,611

(22) Filed: Feb. 24, 2005

(65) Prior Publication Data

US 2006/0185960 A1    Aug. 24, 2006

(51) Int. Cl.
*F16D 51/00*    (2006.01)
*B23P 17/00*    (2006.01)

(52) U.S. Cl. ..................... 192/223; 29/401.1
(58) Field of Classification Search ............. 192/223.1, 192/223.2, 223
See application file for complete search history.

(56) References Cited

U.S. PATENT DOCUMENTS

| | | | |
|---|---|---|---|
| 2,090,265 A | 8/1937 | Padgett | |
| 2,911,962 A * | 11/1959 | McRae ................ | 123/41.11 |
| 3,162,284 A | 12/1964 | Montgomery et al. | |
| 3,236,337 A * | 2/1966 | Marland et al. ........ | 188/82.84 |
| 3,981,381 A | 9/1976 | Nosek | |
| 4,039,058 A * | 8/1977 | Trzebiatowski ......... | 188/82.84 |
| 4,057,131 A | 11/1977 | Flotow | |
| 4,538,713 A | 9/1985 | Wasada | |
| 4,697,675 A | 10/1987 | Johnson, III et al. | |
| 4,815,189 A | 3/1989 | Ijames et al. | |
| 4,941,557 A | 7/1990 | Flotow et al. | |
| 5,038,904 A | 8/1991 | Miller | |
| 5,062,734 A * | 11/1991 | Vanzee et al. ............ | 403/313 |
| 5,322,148 A | 6/1994 | Fernandez | |
| 5,400,885 A | 3/1995 | Phillips | |
| 5,562,418 A | 10/1996 | Agius | |
| 5,769,187 A | 6/1998 | Sommer | |
| 5,857,553 A | 1/1999 | Lagarde et al. | |
| 5,988,326 A | 11/1999 | Sommer | |
| 5,997,012 A * | 12/1999 | Brian ...................... | 403/313 |

(Continued)

FOREIGN PATENT DOCUMENTS

DE    32 41 080 A1    5/1984

(Continued)

OTHER PUBLICATIONS

Certified translation of DE 203 05 562.

(Continued)

*Primary Examiner*—Rodney H. Bonck
(74) *Attorney, Agent, or Firm*—Dykema Gossett PLLC

(57) ABSTRACT

The present invention relates to a drive assembly including an adapter that enables the use of a lightweight backstopping clutch with a driven shaft. The adapter is coupled to the driven shaft for rotation therewith and forms a stub shaft smaller than the driven shaft. The clutch has an inner race that is disposed about the stub shaft and an outer race fixed against rotation so as to allow rotation of the stub shaft and driven shaft in one direction and inhibit rotation in an opposition direction.

19 Claims, 4 Drawing Sheets

U.S. PATENT DOCUMENTS

| | | |
|---|---|---|
| 6,164,428 A | 12/2000 | Berman et al. |
| 6,257,388 B1 | 7/2001 | Cronin |
| 6,464,061 B1 | 10/2002 | Inoue et al. |

FOREIGN PATENT DOCUMENTS

| | | |
|---|---|---|
| DE | 203 05 562 U1 | 6/2003 |
| FR | 2 746 437 | 9/1997 |

OTHER PUBLICATIONS

International Search Report issued in corresponding international patent application PCT/US2006/005149 (Jul. 19, 2006).

Written Opinion issued in corresponding international patent application PCT/US2006/005149 (Jul. 19, 2006).

\* cited by examiner

DRIVE ASSEMBLY WITH LIGHTWEIGHT BACKSTOPPING CLUTCH

FIELD OF THE INVENTION

The present invention relates to a drive assembly in which rotation in a single direction is allowed and in particular to a drive assembly with an adapter allowing the use of a lightweight backstopping clutch.

DISCLOSURE OF RELATED ART

Numerous applications incorporate drive assemblies that provide a rotational force in one direction while prohibiting rotation in an opposite direction. Examples include inclined conveyors, escalators pumps, gear drives, fans, and other applications involving shaft rotation. The use of a backstopping clutch to prevent the reversal of shaft rotation in such applications is well known in the art. A backstopping clutch is designed to prevent a shaft or the rotational element from turning backwards or in the reverse direction when a motor is stopped. Traditionally, backstopping clutches have been used to allow for free rotation of the shaft in a predetermined direction, while preventing the rotation of the shaft in the opposite direction.

Prior coupling designs of a backstopping clutch with a driven shaft of a drive assembly have required the attachment of the clutch directly to the driven shaft. One problem with this method of assembly is the inability to accommodate various size driven shafts with these clutches. Second, large clutches are required in applications having large shafts. Another problem related to the current method is that the drilling and tapping of the driven shaft is labor intensive and limits the flexibility of coupling all of the drive assembly components to one another. Other coupling designs known in the art which couple the backstopping clutch and the driven shaft together are generally expensive, heavy and space demanding during manufacturing, especially due to the their requisite size requirements.

Other prior art designs have resulted in placing size limitations on the components used in the drive assembly. This results in an inability to readily adapt the assembly for use. Consequently, specific driven shafts and clutch assemblies have to be specially sized to be attached to one another. There is a need to provide a drive assembly that allows for various sized clutches and driven shafts to be coupled together. Furthermore, there is a need to have a readily adaptable assembly that is not labor intensive during production.

The inventors herein have recognized a need for a drive assembly having a backstopping clutch that will minimize and/or eliminate one or more of the above-identified deficiencies.

SUMMARY OF THE INVENTION

The present invention relates to a drive assembly. The drive assembly includes a driven shaft. An adapter is coupled to the driven shaft for rotation therewith. The adapter further provides a stub shaft which is smaller than the driven shaft. The drive assembly includes a backstopping clutch having an inner race disposed about the stub shaft and an outer race fixed against rotation. The clutch allows rotation of the stub shaft and driven shaft in a first direction and inhibits rotation in a second direction opposite the first direction.

The present invention further provides a method of assembling a drive assembly, comprising the steps of: providing a driven shaft, an adapter defining a closed bore on a first side and a stub shaft on a second side, a split ring having a plurality of arcuate portions, and a backstopping clutch; inserting the driven shaft through the split ring; removing a spacer between first and second arcuate portions of the split ring; inserting a fastener through the first and second arcuate portions; inserting an end of the driven shaft into the closed bore of the adapter; securing the split ring to the adapter using a fastener; placing an inner race of the clutch over the stub shaft; and fixing an outer race of the clutch against rotation.

A drive assembly in accordance with the present invention is advantageous because it provides an assembly that is readily coupled together and is readily adaptable. Further, the assembly enables the coupling of clutches and driven shafts of various diameters and the use of relatively smaller, lightweight clutches in applications employing large shafts.

BRIEF DESCRIPTION OF THE DRAWINGS

Embodiments of the invention will now be described with reference to the accompanying drawings in which.

DESCRIPTION OF THE PREFERRED EMBODIMENTS

Figure 1:
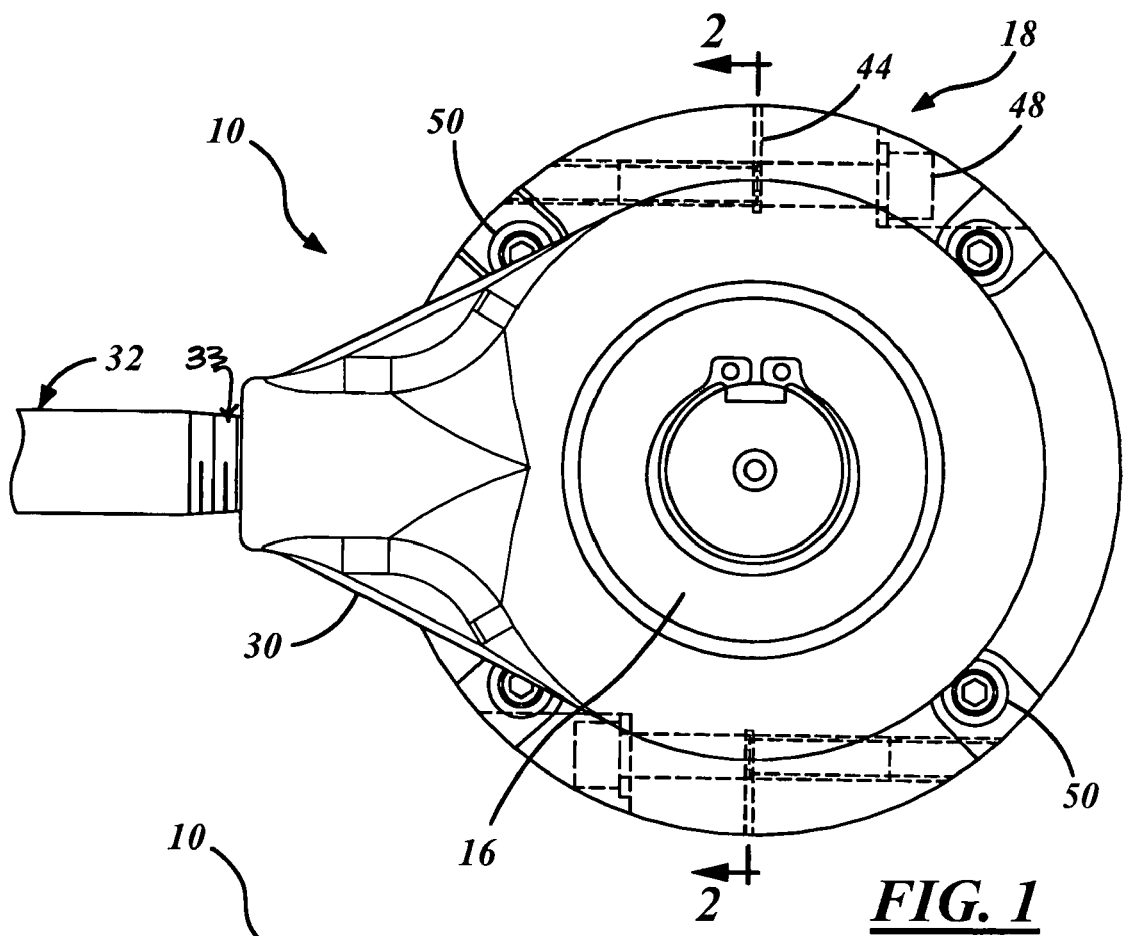
FIG. 1 is a perspective view of the drive assembly of the present invention.
Figure 2:
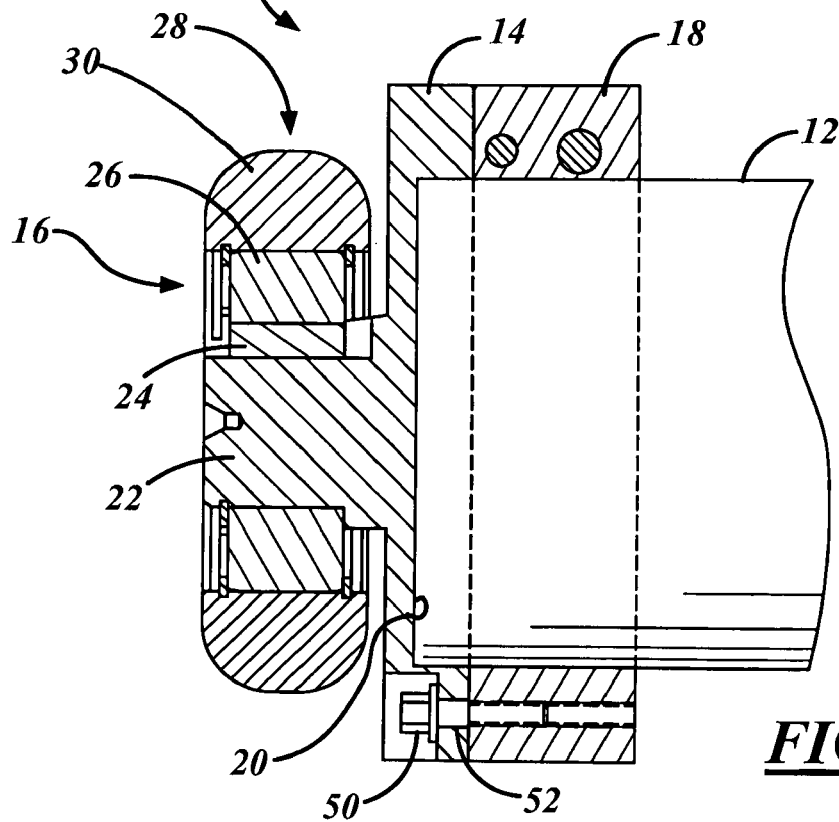
FIG. 2 is a cross sectional view of a portion of the drive assembly of FIG. 1.

Referring now to the drawings wherein like reference numerals are used to identify identical components in the various views, FIGS. 1-2 illustrate one embodiment of a drive assembly 10 in accordance with the present invention. The drive assembly 10 includes a driven shaft 12 coupled to an adapter 14 for rotation therewith and for engaging a backstopping clutch 16. Driven shaft 12 may be used to provide rotation in a variety of applications including inclined conveyors, escalators pumps, gear drives, fans, and other applications involving shaft rotation. A split ring 18 is provided around driven shaft 12 for coupling of driven shaft 12 to adapter 14.

As can be seen in FIGS. 1 and 2, driven shaft 12 is engagingly received by adapter 14. In particular, adapter 14 defines a closed bore 20 for receiving driven shaft 12. Closed bore 20 reflects the size and shape of one end of driven shaft 12 for engagingly receiving driven shaft 12. Upon the rotation of driven shaft 12, adapter 14 reflects the same rotation due to the engagement of driven shaft 12 with adapter 14. A stub shaft 22 is further provided by adapter 14 on which backstopping clutch 16 is supported. Stub shaft 22 may be smaller in diameter than driven shaft 12, thereby enabling use of a smaller backstopping clutch 16 than would be required if clutch 16 were disposed about shaft 12. Accordingly, stub shaft 22 may vary in size based on the size configurations of the assembly components. Stub shaft 22 is provided on the opposite side of adapter 14 from the side providing closed bore 20. The coupling of stub shaft 22 with backstopping clutch 16 allows for the transfer of a braking force from clutch 16 to adapter 14 and shaft 12 to prevent rotation of shaft 12 in one direction.

As seen in FIG. 2, backstopping clutch 16 includes an inner race 24 and an outer race 26. Inner race 24 of clutch 16 rotates with driven shaft 12 through the coupling of inner race 24 to stub shaft 22 of adapter 14. The relative speed of rotation of inner race 24 may vary based on the relative size ratio of the diameter of stub shaft 22 to the diameter of driven shaft 12. Inner race 24 is permitted to rotate in one given direction through its engagement with stub shaft 22. Therefore, the engaging rotation of driven shaft 12 with adapter 14 results in the simultaneous transferred rotation of inner race 24.

Figure 3:
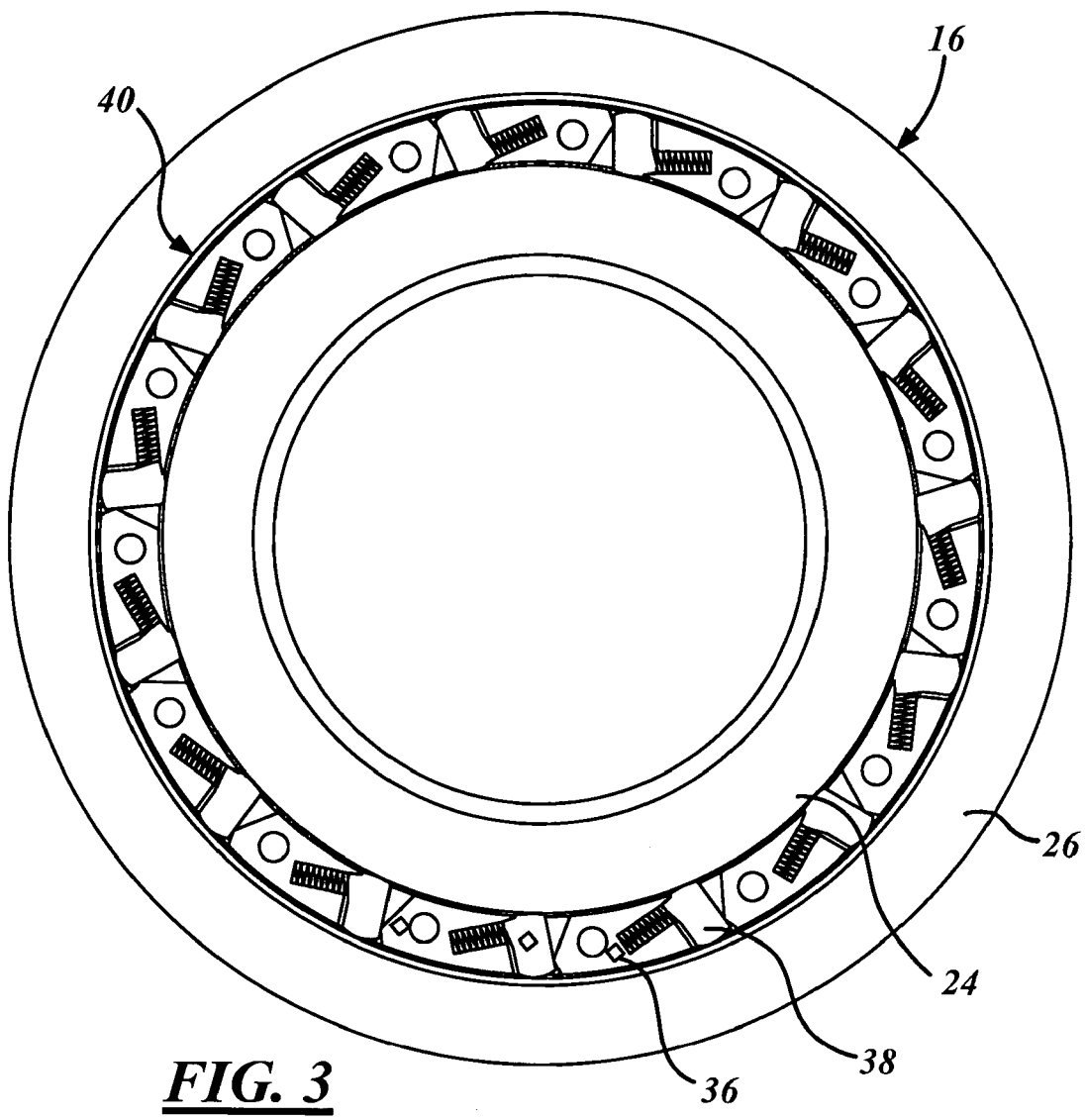
FIG. 3 is a cross sectional frontal view of a portion of the drive assembly of FIG. 1.

Referring to FIG. 3, clutch 16 further provides a plurality of spring loaded plungers 36 disposed about the circumferential periphery of inner race 24. Each of the spring loaded plungers 36 are engagingly coupled to a locking roller 38. The individual spring loading of locking rollers 38 provide constant force between locking rollers 38 and both the inner race and outer race, 24 and 26, respectively. Locking rollers 38 engage a cylindrical groove 40 provided by outer race 26. The cylindrical groove 40 provided by outer race 26 reflects the circular exterior of roller 38 for receiving and providing a surface of engagement for each of the locking rollers 38. Upon rotation of inner race 24 in a backward direction, locking roller 38 prevents further backward rotation of inner race 24 by pressing resistance upon outer race 26. The force provided by spring loaded locking rollers 38 against outer race 26 ensures instantaneous lock-ups when switching from various engagement modes. Various designs of effective locking rollers may be used and are not limited to solely cylindrical configurations. Similarly the provided groove for engagement of the locking rollers may vary in design to reflect the configuration of the rollers.

Figure 4:
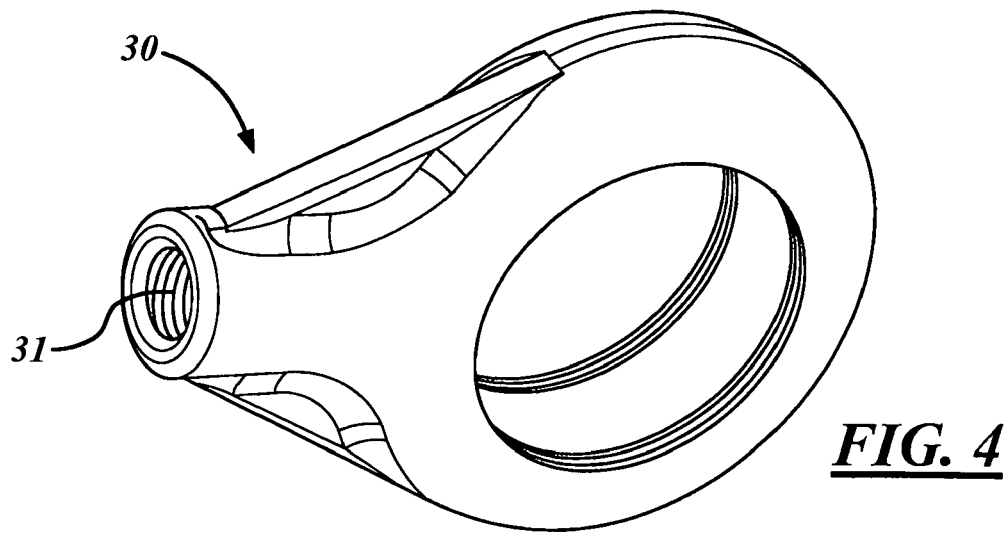
FIG. 4 is the perspective view of a portion of the drive assembly of FIG. 1.

Outer race 26 of the clutch 16 is fixed from rotation due to the engagement of outer race 26 with a torque arm 28. Torque arm 28 includes a head 30 and a shaft 32. Head 30 of torque arm 28 is coupled with outer race 26 of clutch 16 thereby fixing outer race 26 against rotation. More particularly, outer race 26 is press fit into head 30 thereby securely fixing outer race 26 against head 30. Various other methods may be used to fix outer race 26 from rotating within head 30 of torque arm 28 in addition to the press fit embodiment as described by the present invention. Torque arm 28 is further provided with shaft 32. Shaft 32 provides a threaded portion 33 on end 34. As shown in FIG. 4, head 30 provides a threaded aperture 31 for engagingly receiving threaded portion 33 of shaft 32. The other end of shaft 32 is held in a fixed position by mounting to a frame or similar stationary structure.

Figure 5B:
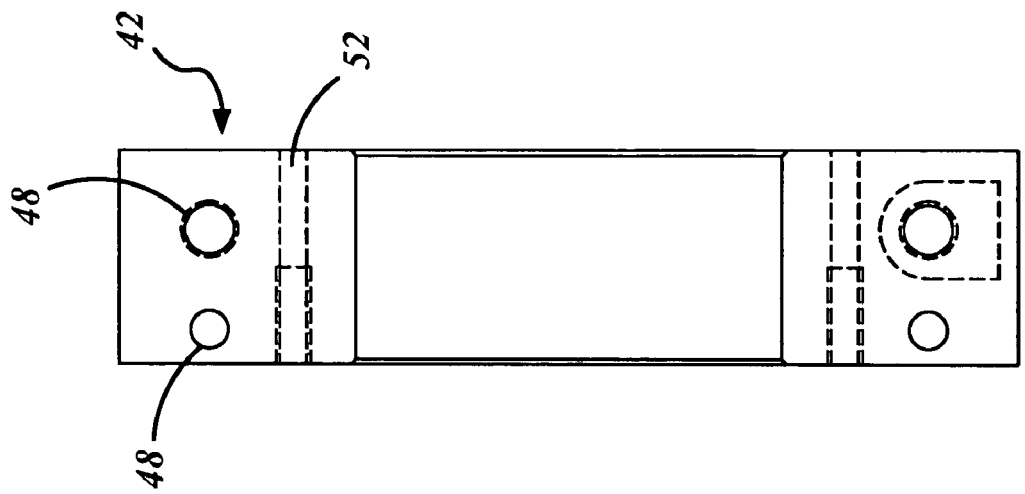
FIGS. 5a and 5b are cross sectional views of a portion of the drive assembly of FIG. 2.
Figure 5A:
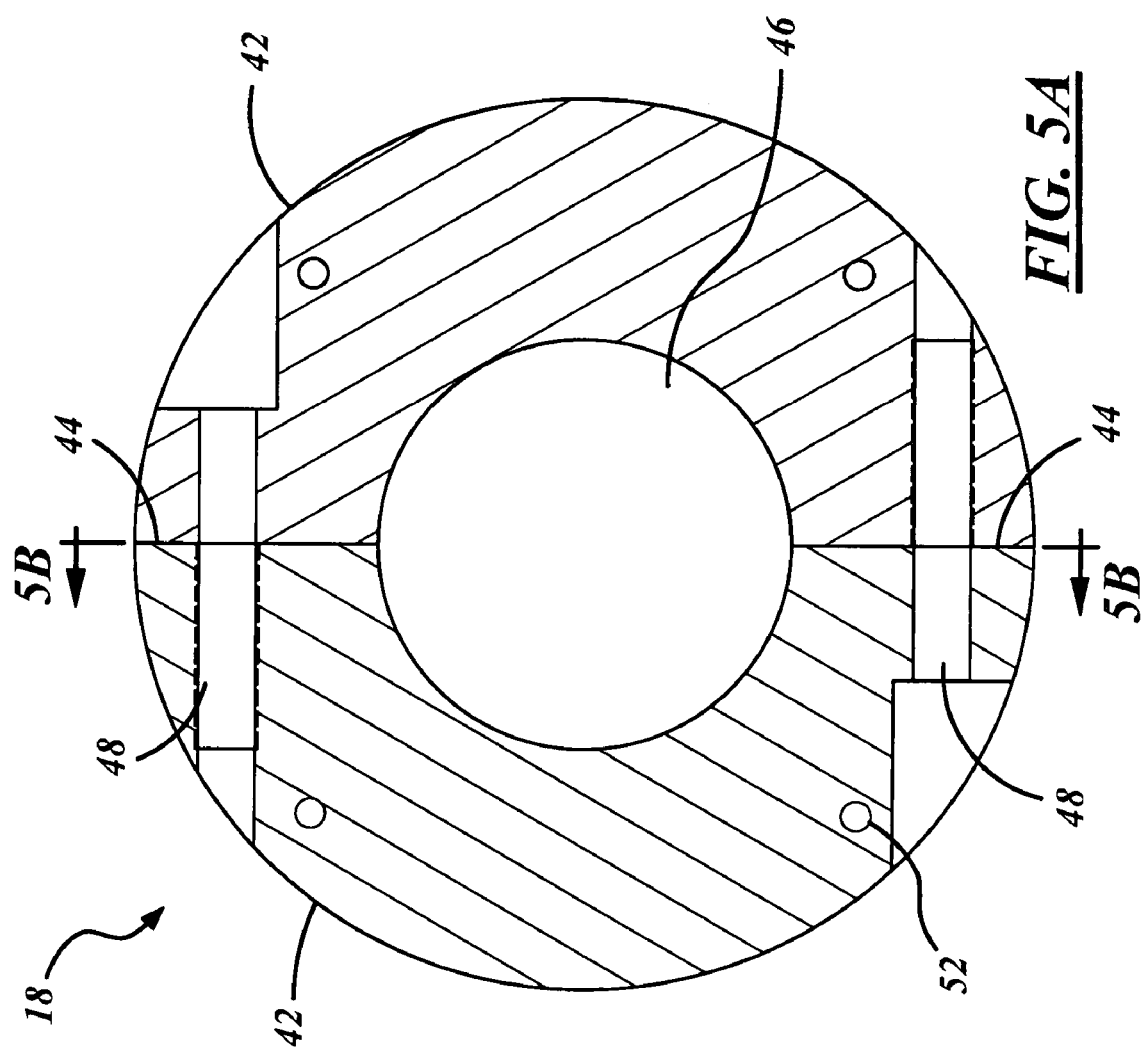

As can be seen in FIG. 2, a split ring 18 is further disposed around driven shaft 12 and is coupled to adapter 14. More particularly, with reference to FIGS. 5a and 5b, split ring 18 includes a plurality of arcuate portions 42. Various configurations of arcuate portions 42 may be used, ranging in the use of at least one arcuate portion to the use of a plurality of arcuate portions configured together to provide split ring 18. Arcuate portions 42 are further provided with one or more spacers 44 between each of the arcuate portions 42. The use of spacer 44 allows for configuring the split ring 18 to a proper size and configuration for coupling around driven shaft 12. Prior to positioning of split ring 18 around driven shaft 12, split ring 18 is bored to provide an aperture 46. Aperture 46 is bored to a dimension reflective of driven shaft 12, thereby resulting in a clearance or slip fit of split ring 18 with driven shaft 12. Split ring 18 is coupled to driven shaft 12 by receiving one end of driven shaft 12 through aperture 46. Each of the spacers 44 are removed and arcuate portions 42 are fixedly attached together though the use of one or more fasteners 48. Fasteners 48 could comprise bolts, screws, pins, adhesives, or welds. Fasteners 48 maybe provided perpendicular to a plane containing the axis of rotation of driven shaft 12. The fastening of arcuate portions 42 around driven shaft 12 results in split ring 18 being torqued down and distorted upon its gripping of driven shaft 12. The fastening of arcuate portions 42 results in split ring 18 being fixedly coupled to driven shaft 12.

The end of driven shaft 12 having split ring 18 is coupled to adapter 14 through the use of at least one axially extending fastener 50. Again, various fastener means known in the art may be used through this application, including but not limited to, bolts, pins, adhesives, welds, screws and other fasteners known in the art. Adapter 14 is placed on driven shaft 12 and fastened to split ring 18 via clearance holes 52. Clearance holes 52 are provided to accommodate the split ring distortion and securely attach adapter 14 to split ring 18.

Figure 6:
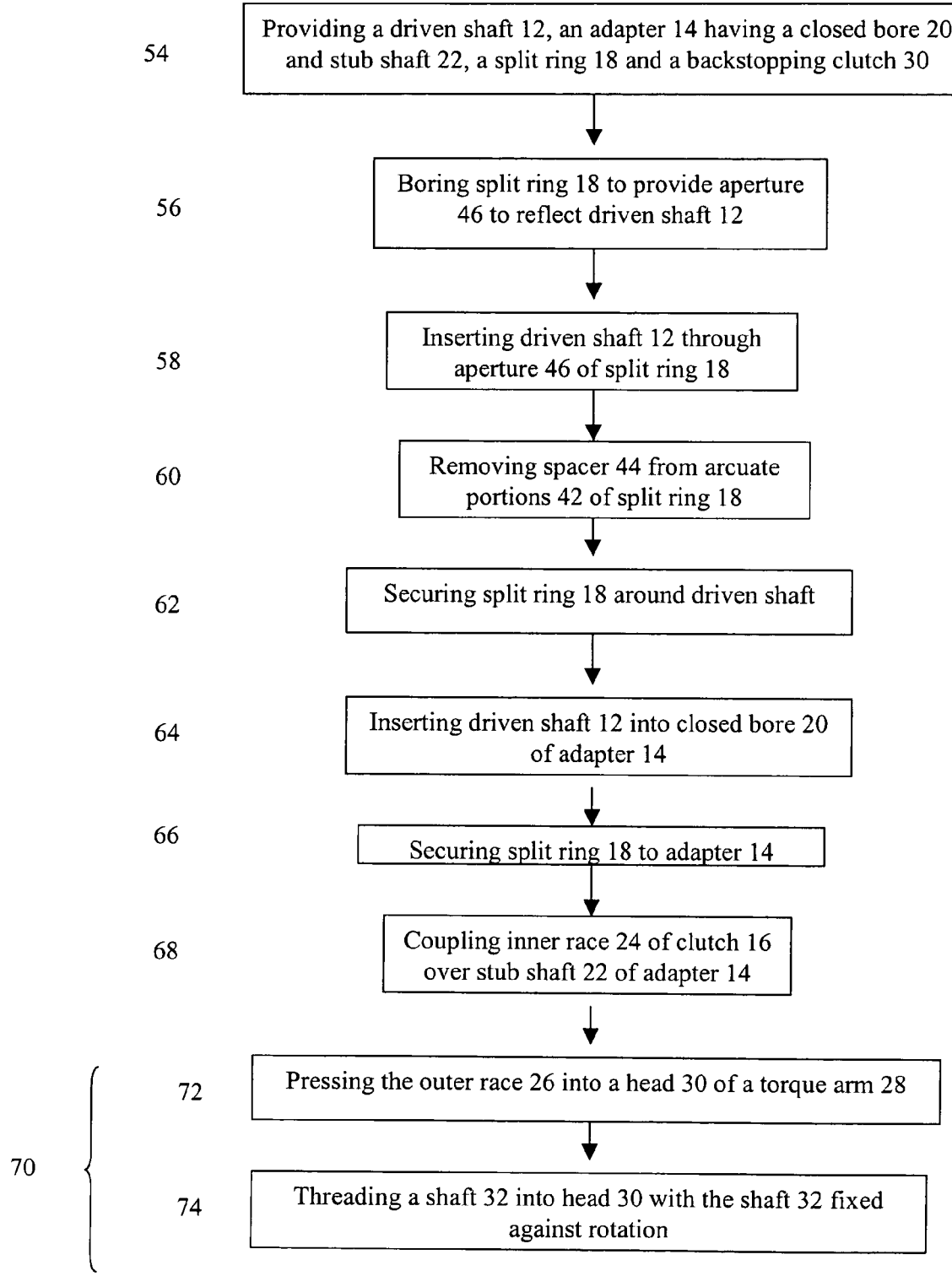
FIG. 6 is a flow chart of the method of assembly in accordance with the present invention.

Referring to FIG. 6, a method of assembling the drive assembly 10 of the present invention is described. The inventive method may begin with step 54 of providing a driven shaft 12, an adapter 14 defining a closed bore 20 on one side and a stub shaft 22 on another side, a split ring 18 having a plurality of arcuate portions 42 and a backstopping clutch 16. As described above, split ring 18 may further includes a plurality of spacers 44 between arcuate positions 42. The method may continue with step 56 of boring split ring 18 to form aperture 46 to reflect the dimensions of driven shaft 12. The method may continue with steps 58, 60 of inserting driven shaft 12 though split ring 18 (in particular, through aperture 46 of split ring 18) and removing spacers 44 between arcuate portions 42. The method may continue with the step 62 of inserting a fastener 48 through the arcuate portions 42 of split ring 18. As fastener 48 is inserted, split ring 18 is torqued down around driven shaft 12 and distorted for securing around shaft 12. The method may continue with the step 64 of inserting the end of driven shaft 12 into closed bore 20 of adapter 14. Once adapter 14 is fitted over the end of driven shaft 12, the method may continue with the step 66 of securing split ring 18 to adapter 14 using one or more fasteners 50. As mentioned above, axially extending fasteners 50 may be inserted through adapter 14 and into clearance holes 52 to secure adapter 14 and split ring 18 together on driven shaft 12. The method may continue with the step 68 of placing an inner race 24 of clutch 16 over stub shaft 22 of adapter 14. The method may conclude with the step 70 of fixing an outer race 26 of clutch 16 against rotation. Step 70 may include the substeps 72, 74 of pressing the outer race 26 into a head 30 of a torque arm 28 and threading a shaft 32 into head 30 with the shaft 32 fixed against rotation.

A drive assembly and method of assembly in accordance with the invention has several advantages. First, the inventive device and method enable relatively easy assembly while providing effective backstopping methods. Second, the inventive device and method enable assembly of components despite variations of size among clutches and driven shafts.

While the invention has been particularly shown and described with references to preferred embodiments thereof, it is well understood by those skilled in the art that various changes and modifications can be made in the invention without departing from the spirit and scope of the invention.

We claim:

1. A drive assembly, comprising:
   a driven shaft;
   an adapter coupled to said driven shaft for rotation therewith; said adapter forming a stub shaft smaller than said driven shaft; and
   a backstopping clutch having an inner race disposed about said stub shaft and an outer race fixed against rotation, said clutch allowing rotation of said stub shaft and driven shaft in a first direction and inhibiting rotation in a second direction opposite said first direction
   further comprising a split ring disposed about said driven shaft and coupled to said adapter.

2. The drive assembly of claim 1, wherein said adapter and said split ring are coupled together through the use of at least one axially extending fastener.

3. The drive assembly of claim 1 wherein said split ring comprises a plurality of arcuate portions.

4. The drive assembly of claim 3 wherein said split ring further includes a spacer disposed between first and second arcuate portions of said split ring.

5. The drive assembly of claim 4 wherein first and second arcuate portions of said split ring are coupled together by a fastener.

6. The drive assembly of claim 5 wherein said fastener is perpendicular to a plane containing an axis of rotation of the driven shaft.

7. The drive assembly of claim 1 wherein said adapter defines a closed bore on a first side of said adapter for receiving said driven shaft.

8. The drive assembly of claim 7 wherein said stub shaft of said adapter extends from a second side of said adapter opposite said first side of said adapter.

9. The drive assembly of claim 7 further comprising a torque arm coupled to the outer race of said backstopping clutch.

10. The drive assembly of claim 9 wherein said torque arm includes a head disposed about said outer race of said clutch, and a shaft extending from said head and fixed against movement.

11. The drive assembly of claim 10 wherein said shaft of said torque arm is threaded into said head.

12. A drive assembly, comprising:
    a driven shaft;
    an adapter having a first side and a second side, wherein a closed bore is defined on said first side of said adapter and a stub shaft extends from said second side of said adapter, said closed bore receiving said driven shaft for rotation therewith;
    a split ring having at least one arcuate portion disposed about said driven shaft and coupled to said adapter; and
    a backstopping clutch, wherein said clutch includes an inner race disposed about said stub shaft and an outer race, said clutch allowing rotation of said stub shaft and driven shaft in a first direction and inhibiting rotation in a second direction opposite said first direction.

13. The drive assembly of claim 12 further comprising a torque arm coupled to the outer race of said backstopping clutch.

14. The drive assembly of claim 13 wherein said stub shaft of said adapter is smaller than said driven shaft.

15. The drive assembly of claim 14 wherein said torque arm includes a head disposed about said outer race of said clutch, and a shaft extending from said head and fixed against movement.

16. The drive assembly of claim 15 wherein said shaft of said torque arm is threaded into said head.

17. A method of assembling a drive assembly, comprising the steps of:
    providing a driven shaft, an adapter defining a closed bore on a first side and a stub shaft on a second side, a split ring having a plurality of arcuate portions, and a backstopping clutch;
    inserting said driven shaft through said split ring;
    removing a spacer between first and second arcuate portions of said split ring;
    inserting a first fastener through said first and second arcuate portions;
    inserting an end of said driven shaft into said closed bore of said adapter;
    securing said split ring to said adapter using a second fastener;
    placing an inner race of said clutch over said stub shaft; and
    fixing an outer race of said clutch against rotation.

18. The method of claim 17 further comprising the step of boring an aperture through said split ring for receiving said driven shaft.

19. The method of claim 17 wherein said fixing of said outer race further includes pressing said cuter race into a head of a torque arm and threading a shaft into said head, said shaft fixed against rotation.

* * * * *